(12) United States Patent
Burke et al.

(10) Patent No.: US 9,792,609 B2
(45) Date of Patent: Oct. 17, 2017

(54) FRAUD DETECTION SYSTEMS AND METHODS

(71) Applicant: VERAFIN, INC., St. John's (CA)

(72) Inventors: Andrew Burke, Paradise (CA);
Thomas Chalker, Mount Pearl (CA);
Jamie King, St. John's (CA); Jonathan Lilly, Conception Bay South (CA);
Alain O'Dea, St. John's (CA);
Raymond Pretty, St. John's (CA);
Charles Robertson, St. John's (CA);
Shuang Wu, St. John's (CA)

( * ) Notice: Subject to any disclaimer, the term of this patent is extended or adjusted under 35 U.S.C. 154(b) by 447 days.

(21) Appl. No.: 14/468,134

(22) Filed: Aug. 25, 2014

(65) Prior Publication Data

US 2016/0132886 A1    May 12, 2016

Related U.S. Application Data

(60) Provisional application No. 61/869,975, filed on Aug. 26, 2013.

(51) Int. Cl.
*G06Q 20/40* (2012.01)
*G06Q 20/32* (2012.01)
*G06Q 20/38* (2012.01)

(52) U.S. Cl.
CPC ..... *G06Q 20/4016* (2013.01); *G06Q 20/3224* (2013.01); *G06Q 20/3827* (2013.01)

(58) Field of Classification Search
None
See application file for complete search history.

(56) References Cited

U.S. PATENT DOCUMENTS

| | | | | |
|---|---|---|---|---|
| 5,920,900 A | * | 7/1999 | Poole | G06F 17/30949 707/E17.036 |
| 2011/0060905 A1 | * | 3/2011 | Stack | G06Q 10/10 713/167 |
| 2012/0072723 A1 | | 3/2012 | Orsini et al. | |

OTHER PUBLICATIONS

"2012 Online Fraud Report: Online Payment Fraud Trends, Merchant Practices and Benchmarks." CyberSource. http://cybersource.com, 2012 CyberSource Corporation, 21 pages.
Canadian Office Action dated Sep. 1, 2016 in corresponding Canadian Application No. 2,860,179, 4 pages.

\* cited by examiner

*Primary Examiner* — Steven Kim
*Assistant Examiner* — Timothy Sax
(74) *Attorney, Agent, or Firm* — Eric L. Sophir; Dentons US LLP

(57) ABSTRACT

Systems and methods disclosed herein related to a fraud detection system that receives data from multiple sources and normalizes the data to create transaction data using overlapping data from the multiple sources. Fraud analysis is performed using a probabilistic approach to alert generation, wherein alerts are only sent to customers when the probability of fraud exceeds a threshold. As a result, false positives are avoided.

12 Claims, 5 Drawing Sheets

FRAUD DETECTION SYSTEMS AND METHODS

CROSS-REFERENCE TO RELATED APPLICATIONS

This is a non-provisional patent claiming priority to U.S. Provisional Patent Application No. 61/869,975, entitled "Fraud Detection Systems And Methods," filed Aug. 26, 2013, which is hereby incorporated in its entirety.

TECHNICAL FIELD

The present invention relates generally to fraud detection, and more particularly, to a fraud detection and money laundering detection system.

BACKGROUND

Fraudulent transactions are unfortunately common in today's marketplace. According to its 2012 Online Fraud Report, CyberSource noted that fraud losses more than doubled in the last decade. In North America alone, fraud losses may reach as high as $4 billion a year ("2012 Online Fraud Report: Online Payment Fraud Trends, Merchant Practices and Benchmarks." CyberSource. http://cybersource.com. Page 1). Most of these losses are absorbed by merchants involved in fraudulent transaction or a credit card issuer. As a result of the huge losses that may be incurred by financial institutions and merchants, financial institutions are fighting back with the use of sophisticated technology to detect and prevent fraudulent transactions.

Fraudulent transactions may take many forms, such as credit card theft, money laundering, securities fraud, skimming, tax havens, and other financial crimes. Federal laws and federal authorities assist financial institutions in prosecuting criminals, but financial institutions still desire to further protect their assets from fraudulent transactions and other financial crime. To protect assets and identify fraud, financial institutions and third party software companies working with financial institutions have developed fraud detection systems and applications.

Conventional fraud detection applications are generally rule-based. Rule-based fraud detection systems generate many false positives because any time that an event defined as fraud by a rule occurs, the fraud detection system generates an alert. In some circumstances, the event determined to be fraud by the rule-based system is not fraudulent, but simply a result of the rule-based system lacking all of the facts. Because rule-based fraud detection systems do not gather enough information, false positives can arise.

While rule-based fraud detection systems may generate many alerts, which may be erring on the side of caution, false positives require a fraud case worker to perform many additional investigative steps to determine if fraud has actually occurred. These additional steps may consume a lot of the case worker's time and lead to mistakes. Thus, a fraud detection system must minimize the number of false positives and find true fraudulent activity so that case worker time may be saved and more instances of real fraud may be discovered by the fraud detection application.

Also, because the rule-based fraud detection systems analyze only one transaction at a time, false positives may arise because the fraud detection system does not know the history of certain funds. For example, a bank customer may wire a very large sum of money. Such a wire transfer may be an unusual financial action for that customer. In a rule-based system such a wire transaction may trigger money laundering concerns. However, without knowing the source of the funds or other transaction details, the rule-based system cannot know for certain whether fraudulent activity has occurred.

Also, rule-based fraud detection systems may overlook some financial activity deemed to be insignificant because the rule-based fraud detection system is only looking at transactions from a narrow scope. For example, money may be laundered using small amounts, which are deemed insignificant when only looking at one transaction, such as a wire transfer. These "insignificant" financial transactions may be significant in the aggregate, or significant when viewed in the context of other transactions. So, a fraud detection system should be able to study and analyze many transactions across many different payment processing networks to find fraud that rule-based systems may miss or overlook.

SUMMARY

The systems and methods described herein attempt to overcome the drawbacks discussed above by providing a fraud detection system that receives data from multiple sources and normalizes the data to create transaction objects formed by finding and gathering overlapping data from the multiple sources. The systems and methods described herein analyze fraud by using a probabilistic approach to alert generation, wherein alerts are only sent to customers when the probability of fraud exceeds a threshold. Using this approach, false positives are avoided. Embodiments of the fraud detection system may include various other features including a hashing function to remove personally identifiable information before performing big data processes on the transaction objects. The fraud detection system may perform geographic analysis on separate transactions that may cross state or other jurisdictional boundary lines, and may identify a common point of compromise across similar found instances of fraud. These additional features assist the fraud detection system in avoiding false positives, finding repeat offenders of fraud, and confidentially commingling transaction data from multiple sources in a datacenter.

In one embodiment, a computer-implemented method for removing personally identifiable data comprising receiving, by a computer of a fraud detection system, financial transaction data associated with one or more financial transactions from a server of a first financial institution, wherein the server records the financial transaction data in a non-transitory memory; applying, by the computer, a hashing algorithm using a first hash key to personally identifiable data in the financial activity data received from the banking server associated with the first financial institution, thereby generating a first set of hashed data representing the personally identifiable information from the first financial institution; generating, by the computer, a first reverse hashing map, wherein the first reverse hashing map explains how to restore the personally identifiable information of the first set of hashed data; transmitting, by the computer, the first reverse hashing map to the first financial institution; and deleting, by the computer, the first reverse hashing map and the first hash key.

The method may also comprise choosing, by a computer, a second hash key for a second financial institution; applying, by a computer, a hashing algorithm using the second hash key to all of the personally identifiable data in the financial activity data transmitted by a banking system associated with the second financial institution, thereby generating a second set of hashed data representing the personally identifiable information from the second financial institution; generating, by a computer, a second reverse hashing map, wherein the second reverse hashing map explains how to restore the personally identifiable information of the second financial institution from the code generated by the hashing algorithm; transmitting, by a computer, the second reverse hashing map to the second financial institution; deleting, by a computer, the second reverse hashing map and the second hash key; applying, by a computer, fraud detection analysis applications to the second set of hashed data and the financial activity data associated with the second financial institution.

In another embodiment, a computer-implement method for finding a common point of compromise for fraudulent activity, the method comprising generating, by a computer of a fraud detection system, a plurality of fraud alerts associated with a plurality of financial transactions involving one or more accounts associated with a plurality of financial institutions based upon a fraud detection analysis performed on financial activity data generated by the plurality of financial institutions; identifying, by a computer, a first set of fraud alerts having similar financial transactions or similar instances of fraudulent activity; identifying, by the computer, in the first set of fraud alerts a common geographic point associated with a subset of two or more fraud alerts; and determining, by the computer, a common point of compromise based upon the common geographic point associated with the subset of fraud alerts.

In another embodiment, a computer-implemented method for identifying fraudulent activity associated with a card, the method comprising receiving, by a computer of a fraud detection system, from a server of financial institution financial activity data associated with a card linked to a financial account at the financial institution, wherein the financial activity data stores a plurality of card transactions of the card; determining, by the computer, a geographic location of a transaction terminal associated with each respective card transaction; determining, by the computer, a time when each respective card transaction occurred; in response to the computer determining that the geographic location of a first card transaction and the geographic location of a second card transaction are in different states: determining, by the computer, whether a distance between the geographic location of the first card transaction and the geographic location of the second card transactions can be traversed within a time elapsed between the time of the first card transaction and the time of the second card transaction; and automatically generating, by a computer, a fraud alert in response to determining the distance between the geographic location of the first card transaction and the geographic location of the second card transaction can be traversed within the time elapsed.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings.

The embodiments described above are intended to be exemplary. One skilled in the art recognizes that numerous alternative components and embodiments may be substituted for the particular examples described herein and still fall within the scope of the invention.

The exemplary embodiments provide systems and methods for financial institutions to monitor their customers for fraud and financial crime. The exemplary embodiments execute a number of processes, methods, and systems to analyze a wide range of financial activity for financial fraud and crime. Using alerts and warnings generated by the exemplary embodiments, a financial institution case worker may view fraud alerts, confirm that the fraud is real, and alert the authorities of the fraudulent activity.

Figure 1:
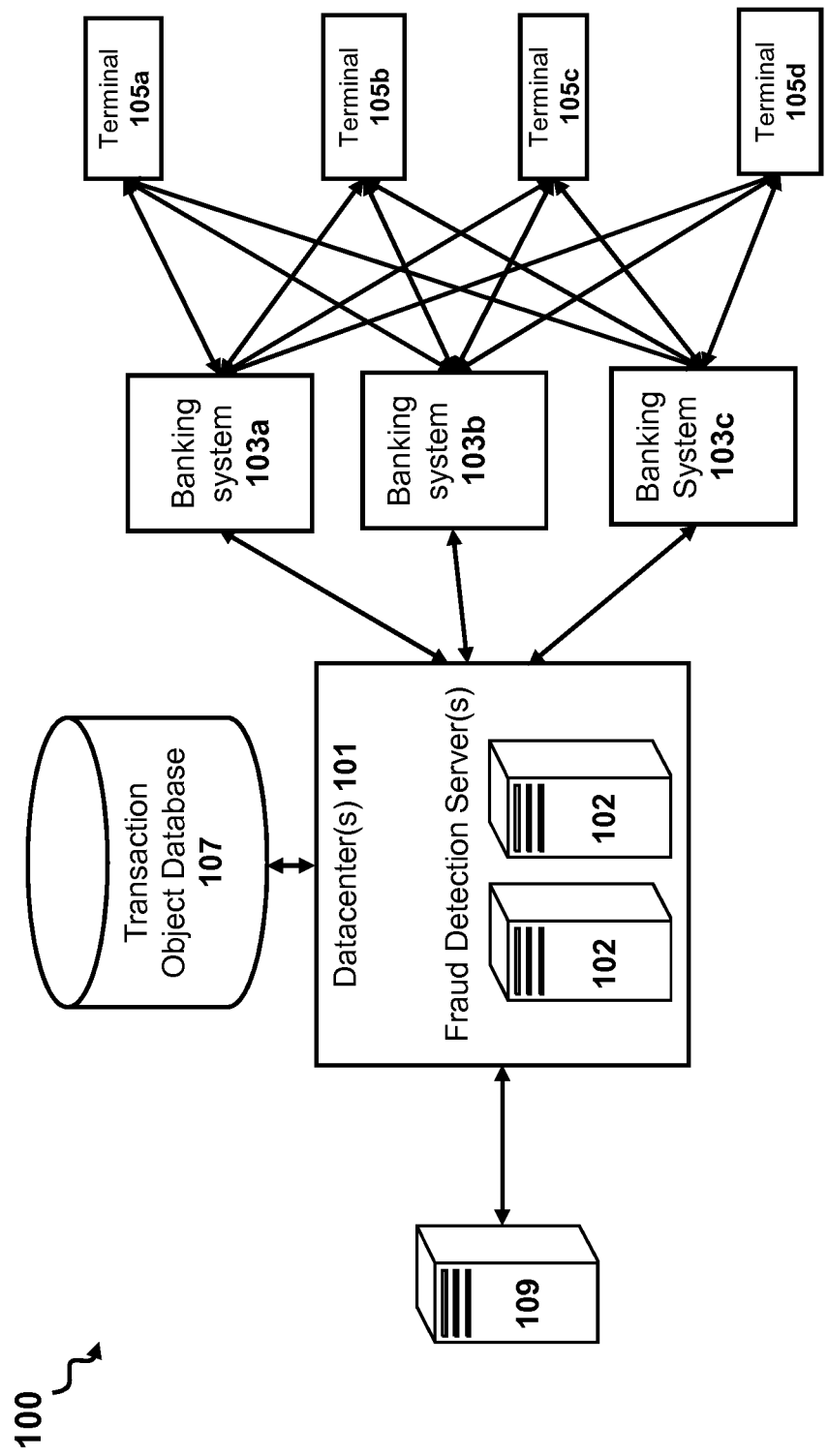
FIG. 1 illustrates a system overview of the fraud detection system according to an exemplary embodiment.

Referring to FIG. 1, a fraud detection system 100 may comprise datacenters 101 housing one or more fraud detection servers 101a. The fraud detection servers 101a may be connected to a plurality of banking systems 103 and receives data from the banking systems 103. The banking systems 103 may be tied to a number of transaction terminals 105 that may be implemented execute transactions. The banking systems 103 may be any suitable computing devices comprising processors and software applications that may instruct those processors to perform the tasks described herein. The banking systems 103 may record and store data associated with the details of monitored transactions made through transaction terminals 105. It should be appreciated that the banking systems 103 may not necessarily be tied to a particular bank or financial institutions, but instead the banking systems 103 may be associated with any financial institution or financial network. For example, the banking systems 103 may be core banking systems 103. A core banking system 103 may be a suitable computer system, such as a server, or a datacenter hosting a plurality of servers, comprising a processor and software modules to perform core banking functions. Non-limiting examples of core banking functions may include recording transactions, maintaining customer records, balancing payments and withdrawals, calculating interests on loans and deposits, among others.

In some embodiments, the banking system 103 may be an online banking logging system, an automated clearing house ("ACH") system, a credit and debit card switch network system, or any other type of computer system for recording details describing financial transactions. The banking systems 103 track and record transaction records. Each of the banking systems 103 may be independent of each other and/or may have different functionality. For example, a first banking system 103a may be communicatively coupled to an ACH network, and the first banking system 103a records and tracks all ACH transactions, while a second banking system 103b may record and track online banking transactions, such as bill payment transactions, mobile deposits, online loan applications, and any other online transaction. Additionally, a third core banking system 103c may monitor wire transactions for customers of a bank. The banking systems 103 may all be under the control of one financial institution, or each banking system 103 may respectively be controlled by or associated with different financial institutions. The number of financial institutions and banking systems 103 may increase or decrease according to the exemplary embodiments described herein. A server 101 of the fraud detection system 100 receives all pertinent transactional data from a financial institution by connecting to all of the financial institution's banking systems 103. As will be described further below, the more data that the fraud detection system 100 receives, the better the fraud detection system 100 may be able to find fraudulent transactions.

It should be appreciated that, in some embodiments, a fraud detection system 100 may be embodied by an individual fraud detection server 102 comprising processors and software modules enabling the server 102 to perform the tasks described herein. It should also be appreciated that, in some embodiments, the system 100 may comprise one or more datacenters 101 having one or more suitable servers 102. In some cases, the amount of servers 102 required for the system 100 may depend on the number of banking systems 103 connected in the system 100. That is, more servers 102 may added to the system 100 as the scale of the system 100 increases, thus demanding more computing power for servicing more banking systems 103. The system 100 may therefore be practiced by one server 102, but the system 100 may be scalable to provide computing power for additional banking systems 103.

In some embodiments, the fraud detection system 100 may be embodied by a software-as-a-service model. The banking systems 103 may receive financial activity data from a plurality of financial transaction terminals 105 connected to the banking systems 103 through a communications network. For example, the banking systems 103 illustrated in FIG. 1 may each be connected to an automated teller machine ("ATM") network, whereby one or more of the financial terminals 105 may be ATMs 105a. When an ATM 105a conducts a financial transaction, such as the withdrawal of money from a checking account, the ATM 105a communicates with a core banking system 103a operated by a financial institution in order to provide banking services to a person withdrawing the money at the ATM 105a. The ATM 105a may be able to communicate with a plurality of banking systems 103 through the ATM network, but in some embodiments, the ATM 105a may only send transaction data to the core banking system 103a controlled by the financial institution providing those banking services to the person withdrawing the money.

In another example, one or more financial terminals 105 are credit card terminals 105b located throughout a region. The credit card terminals 105b may communicate with a credit card issuer's banking system 103b to record the details of credit card transactions made at the credit card terminals 105b. While ATM 105a and credit card terminals 105b have been described to illustrate exemplary financial transaction terminals 105, it should be appreciated that the financial transaction terminal 105 may be any type of computing device comprising a processor and software capable of executing financial transactions. Non-limiting examples of a financial transaction terminal 105 may include a merchant's debit card payment terminal, a customer's personal computer for conducting online banking, a mobile phone for conducting online banking, a bank teller's computer system, terminals for conducting wire transactions, or any other type of financial transaction terminal 105 connected through a network to one or more banking systems 103.

Servers 101 of the fraud detection system 100 may receive data from the banking systems 103 on a periodic basis. For example, the fraud detection system 100 may receive data from the banking systems 103 daily or nightly. In another embodiment, the fraud detection system 100 receives data from the banking systems 103 more frequently. If data is received more frequently, then servers 101 of the fraud detection system 100 may have the ability to deny or allow financial transactions in real time depending on whether the servers 101 of the fraud detection system 100 find fraudulent activity in a contemporaneous transaction.

After fraud detection servers 102 receive data from banking systems 103, the data may be normalized into transaction data. A fraud detection server 102 may organize the transaction data into transaction objects, where each transaction object stores data describing an individual financial transaction. In some cases, the systems 103 of different financial institutions may generate or store transaction data differently (e.g., formats, data fields). Moreover, the systems 103 of financial institutions may generate data at one or more steps of executing a financial transaction or particular banking function. For a given transaction, some banks may format data in different order, include additional unnecessary data, store data for internal uses only, or include any other data manipulation. By normalizing the data received from disparate banking systems 103, a fraud detection server 102 may generate generic transaction objects containing transaction data in a format that may be compatible or easily translatable among the various banking systems 103. In embodiments, the transaction objects may be stored into a transaction object database 107 comprising non-transitory machine-readable storage media. The transaction objects may be agnostic of which financial institution provided the data, as such when fraud detection servers 102 analyze objects in the database 107 for fraud, a transaction object may contain data describing a transaction in a generic format that allows the fraud detection system 100 to understand the transaction regardless of the banking system 103 originating that data.

Transaction objects may comprise one or more data fields containing various types of transaction data (e.g., name, account, transaction type, payee, payor). The fields of a transaction object may depend upon the transaction represented by the transaction object and/or the financial institution originating the transaction object. Non-limiting examples of the types of data associated with transactions may include source account numbers, transaction amounts, direction of the money, destination account numbers, relationship to other members of the financial institution, among others. As mentioned previously, a normalized transaction object may be a generic object containing data that may not be dependent upon the type of transaction or the financial institutions involved with performing the transaction represented by that object. The normalized data in the normalized transaction object may allow a fraud analysis module of a fraud detection server 102 to perform fraud identification analysis, money laundering identification analysis, and financial crime analysis. In some cases, implementing the normalized data may allow the fraud detection system 100 to perform fraud analysis tasks comparatively faster than if the fraud analysis module only received and analyzed raw data from financial institutions, as is often the case for conventional fraud detection tools. As will be described below, the transaction objects allow the fraud detection system to extract data from multiple sources for use in a transaction object.

Fraud detection servers 102 of the fraud detection system 100 may receive data from a variety of different sources, such as core banking systems 103, ATM networks, the ACH network, switch networks for debit/credit card transactions, wire transfers, online banking, check data, and other sources of financial data. The fraud detection servers 102 may use data received from one or more data sources to determine whether fraud has been committed. In some cases, the data received from two different sources associated with a transaction may overlap, which may trigger a fraud detection server 102 to use or merge overlapping data to generate or update a transaction object. For example, a wire transaction between a customer at a first bank and a customer at a second bank may result in both the first bank and the second bank uploading transaction data regarding the wire transaction to the fraud detection servers 102 of the fraud detection system 100. Using the data uploaded from both the first bank and the second bank, the fraud detection servers 102 may be able to learn the account numbers of both parties to the wire transfers, the names of both parties to the wire transfer, the amount of the transaction, and other information associated with the transaction. In another example, a core banking system 103 may transmit stored data about a customer, which may include records of credit card transactions, to the fraud detection server 102, and the fraud detection server 102 may also receive data from the ACH network. The server 102 may automatically determine that data received from the ACH network and data received from the core banking system 103 overlap, thereby causing the fraud detection server 102 to map the ACH data to the core banking data resulting in a transaction object that describes the same transaction.

In some embodiments, financial data mapping and data analysis may be performed using a Bayesian network, which may be a mathematical algorithm (e.g., a statistical model, a graphical model) that determines probabilities of an outcome or the likelihood of an occurrence based on relationships of inputs or variable. The data from the various data sources may be expressed in varying levels of quality. For example, in some cases a switch network may not specify in an easily-determinable format the name of a terminal being used for a credit or debit card transaction. So the switch data may be difficult to match with the data from core banking system 103. However, a Bayesian network uses a probabilistic approach to mapping. If two transactions are substantially similar, the Bayesian network determines that there is a match. By finding transaction data from different sources that overlap with other existing transaction data, fraud detection servers 102 may generate a richer representation of the transaction data in the transaction object because data may be culled from a plurality of banking systems 103. And, even though data may not match completely, the Bayesian network employed by servers 102 of the fraud detection system 100 may match overlapping transaction data to generate a more complete version of the transaction data.

The Bayesian network uses a probabilistic approach to mapping transactions. Depending on the sources of the data, the Bayesian network applies one of a number of different processes to generate a best guess as to whether two sets of financial activity data are related. For example, some financial institutions truncate account numbers. The Bayesian network employs strategies to determine whether the financial activity with a truncated account number overlaps other financial activity data from another source, such as by looking at the name of a party to the transaction, the names of the financial institutions involved, the amount involved, or by creating temporary account numbers until the Bayesian network determines that the truncated account number financial activity likely matches other financial activity data from various banking systems 103. The Bayesian network may utilize a probability threshold that decides whether one set of financial activity data from a first source matches another set of financial activity data from a second source. In some embodiments, manual and/or automatic processes may adjust the probability threshold to achieve a more appropriate sensitivity level for determining whether data from disparate sources is associated with the same transaction.

In some cases, servers 102 may automatically identify financial activity data that the fraud detection system 100 is unable to determine whether the financial activity data matches an existing transaction object. The fraud detection servers 102 may automatically generate and transmit a report to a financial institution's client computer 109 in order to inform a case worker that the system 100 was unsuccessful in matching some portion of the financial activity data. In some situations, a user interface may allow the case worker to manually match the unknown financial activity data with a transaction object. That is, the case worker, using a user interface interacting with a fraud detection server 102 may be displayed on the client computer 109 and may be used to select (i.e., identify) a matching transaction object that already exists in a database 107. In response to such selections, the server 102 automatically associates and stores the previously-unknown financial activity data to the corresponding transaction object. After the case worker has found the matching transaction object for the unknown transaction data, the fraud detection server 102 may store a record of the relationship in a look-up table managed by the fraud detection system 100 so that, in the future, fraud detection servers 102 will be able to match financial activity data similar to the unknown transaction data with the corresponding transaction object.

As part of the Bayesian network analysis, a fraud detection server 102 may perform phonetic name-matching, and/or identify names that are not exact matches but have similar characters. For example, Sara Jones may be listed as "Sarah Jones" in one banking system 103a and "Sara Jones" in another banking system 103b. The Bayesian network performs probabilistic analysis to determine if the data for Sara Jones is the same as the data for Sarah Jones. Using the Bayesian network, the fraud detection server 102 may determine that two similar sounding names are part of one, overlapping financial transaction. Or the Bayesian network may determine that two names with similar characters are actually the same party. The Bayesian network may account for many different possibilities when analyzing whether financial activity data from one source matches or overlaps financial activity data from another source by considering a variety of factors.

After the fraud detection servers 102 receives data from the plurality of banking systems 103, matches overlapping financial activity data, and normalizes the data into a generic transaction object, the fraud detection servers 102 analyze the transaction objects for fraud, money laundering, or other financial crime. In some embodiments, the fraud detection servers 102 may use a Bayesian network to determine whether fraud, money laundering, or financial crime has occurred. The Bayesian network may analyze a plurality of transaction objects in the search for fraud, money laundering, or financial crime. For example, a fraud detection server 102 may correlated data in order to automatically predict and/or identify relationships between transaction objects. The fraud detection server 102 may further consult relationships between members of the financial institution. Further still, manual and/or automated process in the fraud detection server 102 may establish a pattern of expected behaviors for each customer, which may be used as baseline comparison, among other uses. For example, based on past activity, the fraud detection server 102 may expect a customer to deposit three to ten thousand dollars a month, and if the amount deposited is substantially more than the expected behavior, the server 102 may generate an item of evidence suggesting fraud. As the customer's behavior changes over time, the expected behavior parameters may change. The server 102 may automatically adjust the expected behaviors based on updated patterns identified by the server 102.

In some implementations, manual and/or automated processes of a fraud detection server 102 may tailor the server's 102 thresholds for determining whether a departure from expected behavior indicates fraud. For example, a server 102 may be set with a threshold that does not assume fraud has been identified simply because a customer may exceed an expected behavior for deposit amounts. Instead, in this non-limiting example, the fraud detection server 102 aggregates many different transactions together and uses the Bayesian network to asses fraud, money laundering, or other financial crime based on the evidence aggregated from many different sources. So rather than generating an alert that fraud has been committed because a customer did not act according to an expected behavior, the fraud detection system investigates other data related to the customer or the transaction to find other evidences of fraud. If the fraud detection system 100 identifies a certain threshold number of instances of fraud and/or items of evidence suggesting fraud, the Bayesian network may determine the likelihood of fraud is comparatively higher than other transactions, in which case the fraud detection system may automatically generate a fraud alert. In some embodiments, the threshold for fraud may be manually or automatically calibrated based on a financial institution's tolerance for risk. In some embodiments, the threshold's sensitive may also be adjusted for better performance (e.g., too many false positives).

In some embodiments, fraud detection servers 102 of the fraud detection system 100 may analyze geographic considerations as a factor for determining fraud. For example, if a first transaction was performed on the east coast, and a second transaction was performed on the west coast within a relatively short amount of time (e.g., within less than 2 hours), the card has likely been stolen because the card could not travel that distance in that timeframe. In some embodiments, the fraud detection servers 102 may analyze the names of the payer and the payee associated with a transaction. A fraud detection server 102 may compare the names of the payer and payee against a watch list, such as a terrorist watch list, to prevent known terrorists or criminals from being funded or making purchases. Because multiple people may have the same or similar names, the fraud detection system may further analyze the payee's and payor's dates of birth for comparison against watch lists.

After the fraud detection system analyzes data received from the banking systems 103, the fraud detection system sends the results to a computing device 109 of the financial institution, such as a server, a workstation, or client computer. The financial institution's computer 109 may connect to the fraud detection system 100 through any suitable public and/or private networking means (e.g., Internet, intranet, virtual private network), and the fraud detection system 100 may provide the fraud analysis results to the client computer 109. A fraud detection server 102 or other suitable computing device of the system 100 may transmit results to the financial institution's computer 109.

In some cases, a server 102 may comprise a suitable webserver module that is capable of presenting results to financial institution computer 109 via a web-based interface, such as an interface presented on a web browser. The interface may display determined fraud alerts to a fraud case worker who is operating the client computer 109. The case worker may view one or more fraud alerts associated with a customer of the financial institution. Using this web application, the case worker may review each alert to identify what circumstances caused the computer 109 or server 102 to generate the fraud alert. The case worker or automated processes may upload alerts to a fraud monitoring unit. The case worker or automated processes may select each fraud alert and designate whether the alert is associated with fraud, money laundering, another crime, or a false positive. The case worker may also triage the alerts. The case worker can alert federal authorities of the fraudulent activity using the web-based application. In some embodiments, the fraud detection server 102 or financial institution computer 109 may automatically complete a form that is sent to the federal authorities. Further still, the case worker may select a customer for additional monitoring because of the suspicion of fraudulent activity, which may be used when fraud cannot yet be proven but is possible.

Although only one financial institution client computer 109 is shown in FIG. 1, it should be appreciated that a fraud detection computer server 102 may be connected with one or more financial institution client computers 109, which may be associated with one or more financial institutions.

After a case worker reviews the alerts generated by the fraud detection server 102, the case worker may need to perform some due diligence to find out why a customer is behaving unexpectedly. If the case worker determines that the customers behaviors are not suspicious, the fraud detection server 102 may update a database storing patterns of expected behaviors for the customer. If the case worker agrees that the unexpected behavior may be associated with fraud, the case worker may upload the alert to the federal authorities or another department of the financial institution using the client computer 109.

In some embodiments, a Bayesian algorithm executed by fraud detection servers 102 may determine a probably of fraud associated with transactions. If a server 102 determines that the probability of fraud is extremely high (i.e., exceeds a threshold value), the server 102 may be configured to intervene by preventing a banking system 103 from executing the transaction, before a case worker is involved. The ability to automatically block transactions provides financial institutions an added layer of protection from fraud and financial crime.

Figure 2:
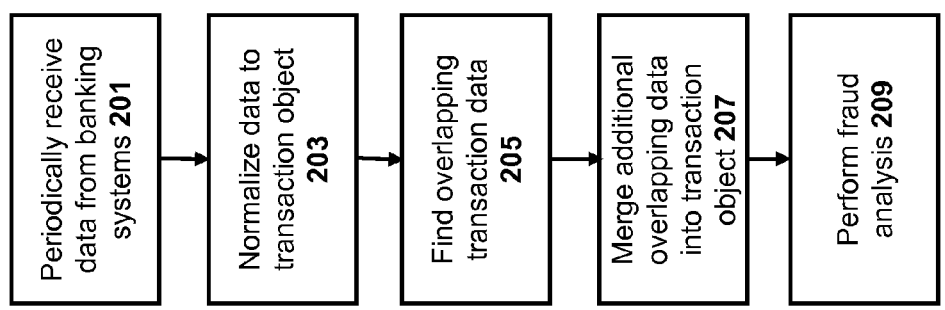
FIG. 2 illustrates a method for performing fraud and money laundering analysis according to an exemplary embodiment.

FIG. 2 illustrates an exemplary method of employing a fraud detection system. As shown in FIG. 2, in a first step 201, the fraud detection system periodically receives data from banking systems, such as on a nightly basis. As described previously, the data may be received by one or more fraud detection servers of the fraud detection system. Each fraud detection server may comprise a processor and memory enabling the server to execute one or more software modules to perform the various tasks described herein. The servers may also comprise suitable networking means (e.g., network interface card) enabling the servers to communicate with the banking systems transmitting transaction data.

In a next step 203, the fraud detection system subsequently normalizes the data received from the banking systems. The normalizing process involves creating transaction objects, which are sets of data that describe all of the essential details of a financial transaction. For example, if a first customer transfers money to a second customer through a wire, the transaction object may describe the first customer's name, the second customer's name, the first customer's account number, the second customer's account number, the first customer's bank, the second customer's bank, the amount of money transferred, the method of transfer (wire), and the time at which the money was transferred. These transaction objects may be stored in a database.

In a next step 205, the fraud detection servers of the system may find overlapping transaction data. That is, after creating transaction objects, the fraud detection system may use a Bayesian network to identify overlapping data. In some embodiments, data that overlaps with existing transaction data may be merged into a previously created transaction object. To continue the previous money transfer example, servers of the fraud detection system may receive core banking data from both the first and the second bank. Both banks may provide data that describes the same wire transaction (i.e., financial transaction), so the fraud detection servers may use that data from both the first and the second bank to insert information into a single transaction object. Thus, in optional step 207, the fraud detection system merges additional information describing the same transaction from another source into one transaction object.

In a next step 209, servers of the fraud detection system perform fraud analysis once the transaction objects have been created. In some embodiments, the fraud analysis system may utilize a Bayesian network to search and correlate multiple instances of fraud or financial crime and items of evidence suggesting fraud or financial crime.

In some cases, the amount of financial activity data gathered by the banking systems is very large in scale. Due to the amount of financial activity data received from the banking systems, the fraud detection system may normalize and analyze a massive block of data. As the number of banking systems transmitting data to the fraud detection system increases, the amount of data increases accordingly. Thus, the fraud detection system may utilize technologies for analyzing big data, such as massively-parallel processing software running on multiple servers. When handling such large data sets, data received from the multiple financial institutions may be commingled in order to perform fraud detection analysis. In some cases, financial activity data may include personally identifiable information. As a result, commingling data for analysis may lead to confidentiality concerns, violate financial institution business policies, or violate federal and state laws.

To combat confidentiality concerns, the fraud detection system may perform hashing on the personally identifiable data. A hash function masks data so that personally identifiable information is removed before being processed by the datacenter. After hashing, the personally identifiable information is represented by a collection of numbers and letters that appears as just a string of alphanumeric characters to any human or computer missing the specific hash key. For example, a customer Fred Smith may be represented by a code XYZ after a hash key is applied to the data representing the name "Fred Smith." After receiving the specific hash key or a reverse hashing map, the hashed data be restored to the original values, which contains the personally identifiable data.

Figure 3:
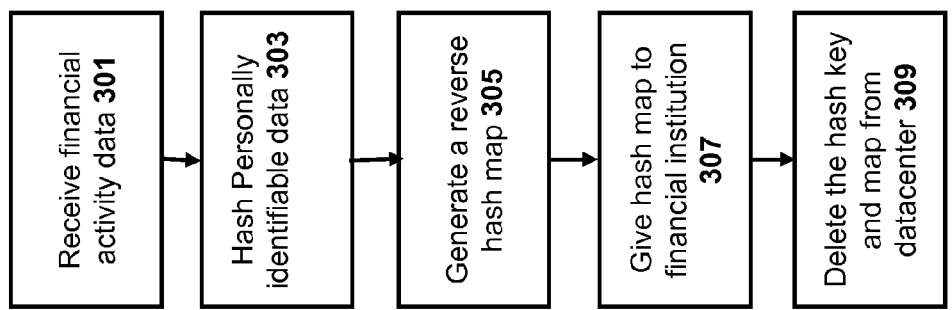
FIG. 3 illustrates a method for removing personally identifiable information before processing data according to an exemplary embodiment.

FIG. 3 shows the steps of a process for removing personally identifiable information before performing fraud analysis, according to an exemplary method embodiment.

In a first step 301 to remove personally identifiable information before performing analysis, the fraud detection servers may receive financial activity data from a financial institution. In a next step 302, the servers may hash personally identifiable information, such as a customer's name and account number, etc., using a hash key. It should be appreciated that the fraud detection system may implement any suitable hashing algorithm capable of obfuscating the underlying information (e.g., SHA-1). As the fraud detection server hashes personally identifiable information, the fraud detection servers in a next step 303 may generate a reverse hashing map, which is a table of information useful for turning the hashed values back into their original values. In other words, the map is the way to restore the personally identifiable information from the hashed data. In a next step 305, after the fraud detection system hashes the personally identifiable information, the fraud detection system may give the reverse hashing map to a financial institution that transmitted the financial activity data. In a next step 309, after the map is transmitted to the financial institution, the fraud detection server may delete the hash key used by the fraud detection server to hash the personally identifiable information or generate the reverse hashing map. In some cases, the fraud detection server is unable to retrieve personally identifiable information after deleting the hash key or reverse hash map in step 309. As a result, software applications, computing devices, and fraud detection servers of a fraud detection datacenter are unable to retrieve or determine the personally identifiable information. Also, if a breach in security occurs, no outside sources will be able to understand the information in the datacenter.

Using the hashed data, the fraud detection system performs fraud analysis. When the fraud detection system reports the findings of the fraud analysis to the financial institution, it reports the findings with the hashed data. Because each financial institution is in possession of the reverse hash map, each financial institution can retrieve the personally identifiable information for that financial institution using the reverse hash map.

The fraud detection system uses a common hashing key for all financial institutions connected to the fraud detection system. The common hashing key is known only within the data center where the fraud detection system has a server storing the financial activity data. Using the hash key, the personally identifiable information of end customers of one or more financial institutions connected to the fraud detection system is not known by the fraud detection system when performing fraud analysis. Often an end customer of a first financial institution may also be an end customer at a second financial institution. By keeping the hash key common across all financial institutions, the fraud detection system can analyze fraud without personal identification information and still know that the same piece of hashed data represents the same end customer who has an account at multiple financial institutions. Even though the fraud detection system does not reveal the hashing key to any of the financial institutions connected to the fraud detection system, the fraud detection system protects the identity of end customers, even if the end customer has an account at multiple financial institutions.

While the hash key used to remove personal identification information should not be known by any system other than the fraud detection system, the fraud detection system may still discard the hash key and replace the discarded hash key with a new hash key to prevent any compromise to the data stored within the fraud detection system. The fraud detection system includes firewalls and additional security to prevent unauthorized access to the confidential information stored by the fraud detection system, but periodic changing of the hash key provides additional security should an active hash key be discovered.

As a further layer of protection for customer data, the fraud detection system may create firewalls for each financial institution that uploads financial activity data. So, before any data is hashed, the data is kept in firewalled area of the datacenter. Thus, the facility is walled off from the confidential data. And, the fraud detection system walls off each financial institution from each other.

Figure 4:
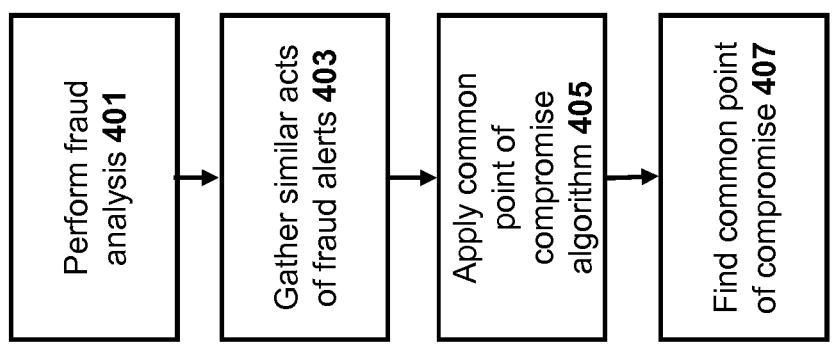
FIG. 4 illustrates a method for finding a common point of compromise across similar instances of fraud according to an exemplary embodiment.

FIG. 4 shows steps of a process for identifying common vulnerabilities or points of comprise. In a first step 401, fraud detection servers of a fraud detection system may perform fraud analysis, which may result in fraud alert being generated. In some instances, when a fraud alert is generated for a specific type of financial activity, such as an unauthorized use of a debit or credit card, there may exist similar fraud for other customers or accounts. For example, a credit card thief may steal multiple credit cards from multiple individuals. The fraud detection system can use similarities found in the fraud alerts to identify a common point of compromise based on similar instances of fraud.

In a next step 403, the fraud detection system gathers fraud alerts for similar types of financial transactions in order to identify a common point of compromise. For example, the fraud detection computer may have found many instances of debit card fraud, and the instances of debit card fraud are gathered together. In a next step 405, the fraud detection servers may analyze the gathered alerts to determine if a common point of comprise exists. In a next step 407, the fraud detection server may employ a number of algorithms to determine a common point of compromise. One such algorithm identifies common terminals associated with the fraud alerts. As an example, one criminal may have stolen a plurality of debit card numbers and associated personal information of the cardholder. The criminal may use the stolen information to purchase a plurality of items from a single personal computer. In this example, by determining that several instances of debit card fraud were carried out from the same terminal, the fraud detection server may identify the terminal or information related to the terminal (e.g., IP address, street address, MAC address) as a common point of compromise. In some implementations, a common point of compromise algorithm may expand the terminal analysis to a more geographic view. Using a geographic approach, if a common terminal cannot be identified, the fraud detection system may identify the common point of compromise based on an unusually high number of instances of fraud localized within a geographic area (e.g., based on a radius around a point or a zip code).

The fraud detection system may apply the common point of compromise algorithm across multiple financial institutions. It may be possible that a criminal may steal debit card information from customers of multiple institutions. So the fraud detection system analyzes all transaction objects, which are commingled in the datacenter and also hashed to remove personally identifiable information, to find similar instances of fraud. Similar acts of fraud are gathered together, such as all instances of debit card fraud or all instances of money laundering. After gathering all similar acts of fraud across all financial institutions that provide financial activity data to the fraud detection system, the fraud detection system applies the common point of compromise algorithm to the gathered similar acts of fraud to find a common point of compromise. By finding a common point of compromise, the federal authorities may be able to track and prosecute criminals of multiple financial crimes.

Figure 5:
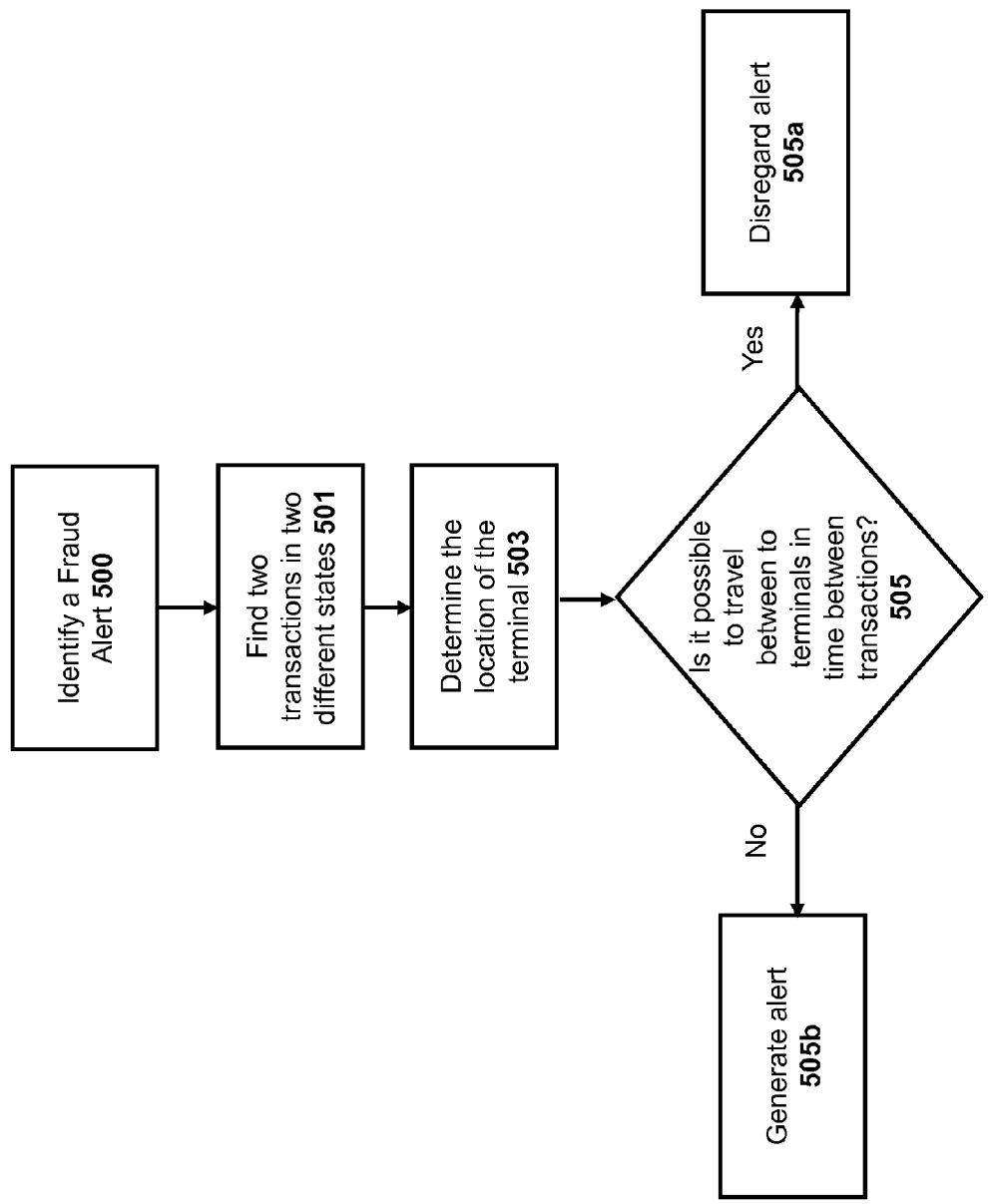
FIG. 5 illustrates a method for performing geographic analysis on transactions that cross state lines according to an exemplary embodiment.

FIG. 5 shows the steps of a process for referencing spatial-temporal factors to determine a likelihood one or more transactions are associated with fraud, according to a method embodiment of the fraud detection system. A fraud detection system may utilize fraud detection algorithms that may mitigate the number of false positives by implementing a geographic approach to fraud detection. Some conventional debit card fraud detection systems may generate a fraud alerts anytime two transactions with the same debit card are performed in two different states, within a relative short period of time. As an example, a bank customer makes a debit card gasoline purchase in Indiana at 3:00 PM and then use the debit card to purchase a movie ticket in Illinois at 3:30 PM. Depending on where in Illinois and Indiana these purchases were made, the distances between the gas station and the movie theater could be very short, even though they are located in different states because Illinois and Indiana share a boarder. As a consequence, such conventional systems may generate a fraud alert for customers living near the boarder of a state who may often make legitimate purchases in two different states.

In some embodiments, the process of FIG. 5 may automatically begin based on triggering event 500, in which a fraud detection server or other suitable device in the fraud detection system determines that a fraud alert should be generated due to certain transaction data.

After receiving fraud alerts in triggering event 500, the fraud detection server may, in a first step 501, identify financial transactions (e.g., debit card transactions) associated with the fraud alert that have occurred in different states. The fraud detection server may then perform geographic analysis on those financial transactions. In a next step 503, the server may identify the locations of financial terminals (e.g., ATMs) associated the transactions. The fraud detection server may determine the distances between the financial terminals. In some embodiments, the locations may be predetermined and stored, or the distances may be automatically calculated.

Next, in a determining step 505, the fraud detection server may determine whether it is possible for a person to travel from the location of a first terminal in the first state, to a second terminal in the second state, within the time that lapsed between the transactions. If server determines that it would be possible to travel the distance between the locations within the time lapsed, then in a next step 505a, the server may ignore the fraud alert because the fact that the transactions were performed in different states is not determinative of fraud. If the server determines that the distance between the locations of the financial terminals could be traveled within the time lapsed, then in a next step 505b, the server may proceed to generate a fraud alert and distribute the fraud alert to a user interface and/or transmit the fraud alert to a financial institution's computing device. Alternatively, rather than ignoring the factor of transactions occurring in different states altogether, some embodiments of the server may mitigate the weight afforded to those disparate locations.

In some embodiments, to determine a likelihood that a debit/credit card transaction made in a different state than a cardholder's home address is associated with fraud, the server may determine whether a purchase made at a terminal in the other state is geographically proximate (e.g., within a radius or other distance, zip code, town, county) to the cardholder's home address. That is, the fraud detection system may reference the debit/credit card purchase history of a cardholder (i.e., bank customer, card issuer customer) to determine whether the cardholder has used that particular terminal in the past. In other words, a fraud detection server may generate patterns for a bank customer's behavior based on locations of previous purchases. In some embodiments, the fraud detection server may reference other bank customer's transaction behavior to determine whether other bank's customers who live geographically nearby to the first bank customer have used the same or similar purchase terminals before. If customers are commonly using terminals across state lines, false positive alerts can be avoided by ignoring or downplaying these facts when identifying and triggering fraud alerts.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "receiving" or "choosing" or "applying" or "generating" or "transmitting" or "deleting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

What is claimed is:

1. A computer-implemented method for removing personally identifiable data comprising:

receiving, by a computer of a fraud detection system, financial transaction data associated with one or more financial transactions from a server of a first financial institution, wherein the server of the first financial institution records the financial transaction data in a non-transitory memory;

identifying, by the computer of the fraud detection system, personally identifiable data within the financial transaction data received from the first financial institution;

generating, by the computer of the fraud detection system, a first set of hashed data of the personally identifiable data by applying a hashing algorithm using a first hash key to the personally identifiable data;

generating, by the computer of the fraud detection system, a first reverse hashing map by creating a table including information used for converting the first set of hashed data back into the personally identifiable data received from the first financial institution;

transmitting, by the computer of the fraud detection system, the first reverse hashing map to the server of the first financial institution;

deleting, by the computer of the fraud detection system, the first reverse hashing map and the first hash key;

performing, by the computer of the fraud detection system, fraud analysis using the first set of hashed data;

generating, by the computer of the fraud detection system, a report containing the likelihood one or more transactions recorded in the financial transaction data are associated with fraud, wherein the report contains first set of hashed data instead of the personally identifiable data;

transmitting, by the computer of the fraud detection system, the report to the server of the first financial institution; and retrieving, by the server of the first financial institution, the personally identifiable data from the report using the first reverse hashing map and the first set of hashed data.

2. The method according to claim 1, further comprising determining, by the computer of the fraud detection system, a likelihood one or more financial transactions in the financial transaction data associated with the first financial institution is associated with fraud based upon a fraud detection analysis of the first set of hashed data and the financial transaction data from the first financial institution.

3. The method of claim 1, further comprising receiving, by the computer of the fraud detection system, financial transaction data associated with one or more financial transactions from a server of a second financial institution, wherein the server of the second financial institution records the financial transaction data in a non-transitory memory.

4. The method according to claim 3, further comprising: applying, by the computer of the fraud detection system, a hashing algorithm using a second hash key to the personally identifiable data in the financial transaction data received from the second financial institution, thereby generating a second set of hashed data representing the personally identifiable information from the second financial institution;

generating, by the computer of the fraud detection system, a second reverse hashing map, wherein the second reverse hashing map explains how to restore the personally identifiable information of the second financial institution from the code generated by the hashing algorithm;

transmitting, by the computer, the second reverse hashing map to the second financial institution; and deleting, by the computer of the fraud detection system, the second reverse hashing map and the second hash key.

5. The method according to claim 4, further comprising determining, by the computer of the fraud detection system, a likelihood one or more transactions associated with the financial transaction data of the second financial institution is associated with fraud based upon a fraud detection analysis of the second set of hashed data and the financial transaction data from the second financial institution.

6. The method according to claim 4, further comprising automatically selecting, by the computer of the fraud detection system, the second hash key for the second financial institution.

7. The method according to claim 1, wherein the personally identifiable data is represented by a collection of numbers and letters after applying the hashing algorithm.

8. The method according to claim 1, wherein the hashing algorithm is applied to obfuscate the personally identifiable data.

9. The method according to claim 1, wherein the hashing algorithm is secure hash algorithm 1 (SHA-1), secure hash algorithm 2 (SHA-2), or secure hash algorithm 3 (SHA-3).

10. The method according to claim 1, further comprising periodically updating, by the computer of the fraud detection system, the hash key.

11. The method according to claim 1, further comprising applying, by the computer of the fraud detection system, a same hash key across all financial institutions, such that the computer identifies a same customer with accounts at multiple financial institutions.

12. The method according to claim 1, further comprising merging, by the computer of the fraud detection system, additional information describing a same transaction from different financial institutions.

* * * * *